Sept. 8, 1953

F. C. FEHRMAN 2,651,300

ANIMAL MOUTH OPENER

Filed Nov. 28, 1951

INVENTOR
FREDERICK C. FEHRMAN

BY *B. P. Fishburne*

ATTORNEY

Patented Sept. 8, 1953

2,651,300

UNITED STATES PATENT OFFICE 2,651,300

ANIMAL MOUTH OPENER

Frederick C. Fehrman, Washington, D. C.

Application November 28, 1951, Serial No. 258,689

1 Claim. (Cl. 128—19)

My invention relates to a mouth opening device for animals.

A primary object of the invention is to provide a mouth opening device which will greatly facilitate caring for the teeth of small animals such as chinchillas.

A further object is to provide an animal mouth opening device which will resiliently hold open the jaws of the animal and permit the animal to have some freedom of movement of its jaws while the teeth are being treated.

A further object is to provide a mouth opener for small animals including novel means for engagement with the teeth, which means serve to properly position the mouth opener relative to the animal's head and also to present the teeth in proper positions for grinding and other necessary operations.

A still further object is to provide an animal mouth opener which is highly simplified and economical in construction, self-adjusting with respect to the jaws of the animal and which cannot be displaced by the animal from the operative position wherein the animal's jaws are held open by the device.

Other objects and advantages of the invention will be apparent during the course of the following description.

Figure 1:
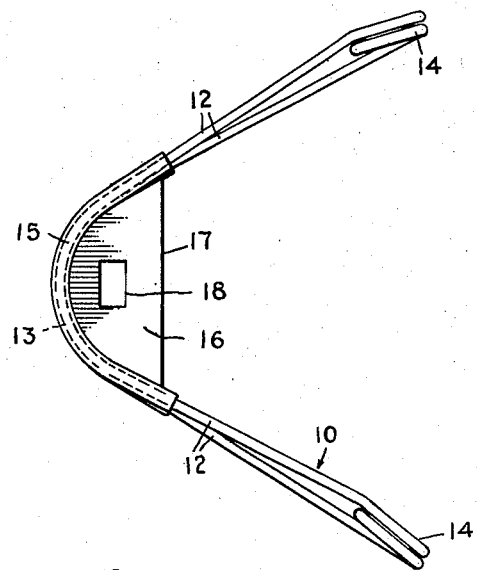
Figure 2:
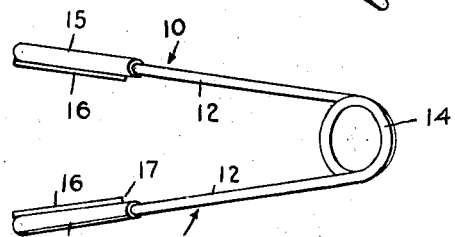
Figure 3:
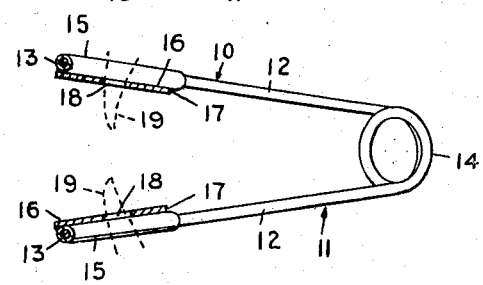
Figure 4:
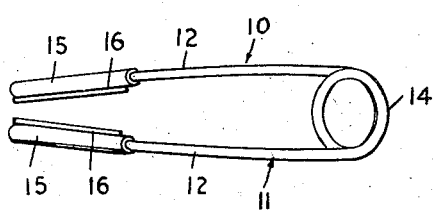

In the accompanying drawings, forming a part of this application and in which like numerals are employed to designate like parts throughout same, Figure 1 is a plan view of a mouth opener embodying my invention, Figure 2 is a side elevation of the same, Figure 3 is a central vertical section through the mouth opener illustrating the operation of the same and the coaction between the device and the animal's teeth, and, Figure 4 is a further side elevation of the mouth opener while positioned for insertion into the mouth of the animal.

In the drawings, where for the purpose of illustration is shown a preferred embodiment of my invention, the numerals 10 and 11 designate upper and lower resilient jaws for holding open the mouth of a small animal such as a chinchilla. The jaws 10 and 11 comprise forwardly converging bars or sides 12, integrally joined at their forward ends by arcuate bar sections or loops 13. The rear ends of the bars 12 are integrally secured to spiral spring coils 14, disposed vertically and formed with the jaws 10 and 11 from a continuous section of spring wire, or the like. The jaws 10 and 11 diverge forwardly, Figure 2, when in the free condition, and the spring coils 14 resiliently bias the jaws in their spread apart or open positions. The individual bars 12 are also somewhat resilient, but are stiff enough to resist closing of the jaws 10 and 11 by the animal.

Arcuate reinforcing sleeves 15 are preferably provided, and rigidly mounted upon the forward arcuate bar sections 13 to reinforce the same against bending or twisting. Flat bit plates 16 are soldered or otherwise rigidly secured to the forward ends of the jaws 10 and 11, and preferably to the lower side of the upper reinforcing sleeve 15 and to the top side of the lower sleeve 15, as shown. The marginal edges of the bit plates 16 are curved to follow the contours of the forward ends of the jaws 10 and 11, and the bit plates have straight transverse rear edges 17 which are disposed near the forward portions of the straight bars 12.

Each bit plate 16 has a substantially central small rectangular opening 18 formed therein and being slightly elongated transversely of the jaws 10 and 11 as shown in Figure 1. The openings 18 of the bit plates 16 are arranged so that they are in substantial vertical alignment, as shown in Figure 3, and the openings are spaced a slight distance rearwardly of the forward ends of the jaws and midway between the bars 12 thereof. The bit plates 16 are relatively thin, but nevertheless substantially rigid, due to their small areas and their continuous connection with the reinforcing sleeves 15. The openings 18 of the bit plates are adapted to receive the animal's upper and lower front fangs or teeth 19 as shown in broken lines in Figure 3, when the device is used to hold open the mouth of the animal.

In the use of the device, the forward ends of the jaws 10 and 11 are grasped between the fingers and drawn together or closed as indicated in Figure 4 of the drawings. While in this position, the bit plates 16 are introduced rearwardly into the mouth of the animal until the openings 18 are adjacent to the front teeth 19. The jaws 10 and 11 are now released and the front teeth 19 will pass through the openings 18 as the jaws 10 and 11 automatically spring open and assume relative positions such as shown in Figure 3. In such positions, the jaws 10 and 11 force the animal's jaws open and maintain them spread apart while the teeth 19 are being ground or otherwise treated by the operator.

The openings 18 are just large enough to accommodate the front teeth of the animal and permit their passage beyond the inner opposed sides of the bit plates, as shown in Figure 3, so that the teeth may be operated upon. The openings 18 coact with the animal's teeth 19 to position the mouth opening device with respect to the animal's head and prevent the same from moving appreciably while in use. The device cannot move relative to the animal's head any appreciable amount since the teeth 19 occupy substantially all of the space afforded by the openings 18. Since the bars 12 are somewhat resilient, and the jaws 10 and 11 are actuated by the spring coils 14, the animal's mouth is resiliently held open by the device and some freedom of movement is thus afforded. However, the device is strong enough to hold open the animal's mouth sufficiently at all times so that the teeth 19 are spaced far enough apart to be treated conveniently by the operator. The opening 18 is substantially twice as long as wide and is adapted to snugly receive the two long front teeth of the chinchilla, whereby the device is held in place in the mouth by the front teeth. The opening 18 being centrally arranged upon the plate 16, the plate extends for substantial distances around the opening. The plate extends beyond the opening in all directions for a greater distance than the corresponding dimensions of the opening. Since the rear edge 17 of the plate is straight, such plate has a large area for covering portions of the mouth.

The lips or jowls of the animal are maintained spaced apart and away from the teeth 19 by the arcuate reinforcing sleeves 15. These sleeves are spaced a sufficient distance radially from the openings 18 to hold back the lips or jowls and prevent the same from overhanging the jaws 10 and 11 and interfering with the operation of a grinder or the like upon the teeth 19.

It is thus seen that I have provided a mouth opening device which is highly simplified in construction, self-adjusting in the animal's mouth and free from adjustable or moving parts. The device functions to spread the animal's jaws apart resiliently and presents the teeth of the animal in convenient positions to be operated upon. The openings in the bit plate serve to connect the device to the head of the animal and hold it against displacement during use, while at the same time presenting the teeth in the most convenient position for treatment. When the device is applied to the animal, the bars 12 and spring coils 14 are of course disposed exteriorly of the animal's head and only the bit plates 16 enter the mouth of the animal. The bars 12, as shown in Figure 1, and the spring coils 14 are disposed upon opposite sides of the animal's head and the animal is facing forwardly or toward the forward arcuate bar sections 13 of the device. The device is bodily carried by the animal when applied thereto and no other connection with the animal's body other than the engagement of the teeth 19 with the openings 18 is required.

It is to be understood that the form of the invention herewith shown and described is to be taken as a preferred example of the same, and that various changes in the shape, size and arrangement of parts may be resorted to, without departing from the spirit of the invention or the scope of the subjoined claim.

Having thus described my invention, I claim:

A device for holding open the mouth of a chinchilla comprising, opposed generally horizontally V-shaped jaws which converge forwardly and receive the head of the chinchilla within them, coil springs connecting the rear ends of the V-shaped jaws to bias them open, a wide substantially flat bite plate disposed inwardly of each V-shaped jaw, each plate being provided centrally thereof with a relatively small opening for snugly receiving the long front teeth of the chinchilla, said plate extending beyond the marginal edges of the opening for substantially a greater distance than the corresponding dimensions of said opening, and means securing each bite plate to the forward reduced end of the adjacent V-shaped jaw, the outer side of each V-shaped jaw extending outwardly beyond its bite plate for forming a lip stop.

FREDERICK C. FEHRMAN.

References Cited in the file of this patent

UNITED STATES PATENTS

| Number | Name | Date |
|--------|------|------|
| 442,180 | Halfpenny | Dec. 9, 1890 |
| 801,710 | Carstensen | Oct. 10, 1905 |